United States Patent Office 2,781,314
Patented Feb. 12, 1957

2,781,314

OIL COMPOSITIONS CONTAINING SOLID PARTICLES

Jones I. Wasson, Union, N. J., assignor to Esso Research and Engineering Company, a corporation of Delaware No Drawing. Application December 29, 1953,
Serial No. 401,076

1 Claim. (Cl. 252—18)

The present invention relates to improved oil compositions. More particularly, it relates to oil compositions containing finely-divided solid material particles.

One of the objects of this invention is to provide rust preventive compositions suitable for use wherever it is desired to protect iron and steel surfaces from rusting. For example, the compositions of this invention may be utilized as crank case lubricants, in industrial hydraulic systems, as slushing oils and other protectorants in the preservation of idle machinery, spare parts, storage drums, etc., although their use is not limited to these specific examples. A further object of this invention involves non-leaking oils for high pressure systems.

It is known in the art to add various types of rust preventive additives to oil compositions for the purpose of increasing the latter's anti-rust properties. Some examples of such compounds are petroleum sulfonates, such as sodium, calcium, barium and other mono- and polyvalent metal sulfonates, degras, alkyl phosphoric acids, sorbitan monooleate, polyglycerol partial esters, etc. While these additives have been established as effective rust inhibiting agents, it has been found in accordance with the present invention that this property may be substantially improved by the addition of small amounts of finely-divided solid substances with high surface areas. The size of these solid particles may range from 0.1 to 100 microns, although the preferred range is between 1 and 10 microns.

While the principle on which this surprising effect of the solid materials is predicated is not fully understood, it has been determined that the materials used should have low water and oil solubility, possess the capacity for promoting and stabilizing a water-in-oil emulsion and preferably have a high surface area. Although most substances that meet these requirements are acceptable, particularly good results have been obtained with materials such as the hydroxides of aluminum, calcium, iron and magnesium, carbonates and sulfates of calcium and barium, carbon black, bentonite-type materials, polyvinyl alcohols, etc.

While bentonitic clays will produce the desired effect, particularly good results have been obtained with substances produced by reacting bentonite-type clays with aliphatic amine salts. The resultant hydrophobic materials are known in the art, some of them having been described in U. S. Patent 2,033,856, issued to Smith on March 10, 1936, as well as in an article by J. W. Jordan in the Journal of Physical Colloid Chemistry, volume 53, No. 2, February 1949, pages 294–305. These organophilic bentonitic materials, especially desirable in the present invention, are obtained by reacting a bentonitic clay with a primary aliphatic amine salt. Normally, these complexes are prepared by first reacting the desired aliphatic amine with an acid, such as acetic or hydrochloric, to form the amine salt which is then added to a water dispersion of the bentonitic material. The complex formed is then washed free of salt, dried and ground.

The oil base for the rust preventive compositions of the invention may be any oil, preferably of lubricating grade with a viscosity range of 32 to 280 S. S. U. at 210° F. While mineral lubricating oil is preferred, fatty oils, such as lard, corn, and cottonseed oils, or synthetic oils, such as silicones, silicates, esters, ethers, formals and the like, likewise form an acceptable base. It is also possible to dilute these oil base compositions with volatile solvents, such as gasoline, kerosene, naphthas, esters, ketones, etc., and apply the total mixture to the metal surface to be protected.

The concentration of the conventional rust preventives in the undiluted oil composition may vary from about 0.5 to 10% by weight, preferably 1 to 6%, and the amount of solid materials used may vary from 0.001 to 0.5%. Preferably, the upper limit should not exceed 0.25% and the preferred range is 0.05 to 0.15% by weight.

In the examples below is given a detailed description of laboratory tests which demonstrate the effectiveness of the compositions of the present invention. It is to be understood, of course, that these examples are merely recited by way of illustration and are not to be construed as limiting the scope of the invention in any way.

EXAMPLE 1

Compositions were prepared by mixing various percentages of commercial anhydrous aluminum hydroxide, pulverized to an average particle size of about 1 to 10 microns, with a lubricating oil base stock consisting of a conventionally refined naphthenic oil of 40 seconds viscosity (Saybolt) at 210° F. and containing sodium sulfonate (molecular weight 466). These blends as well as a sample of the unblended base stock and another composition in which the sodium sulfonate was omitted were subjected to a humidity cabinet test in order to determine the degree to which the oil compositions prevent the rusting of a metal surface in a warm humid atmosphere. These tests were conducted by dipping sand blasted panels of SAE 1010–1020 cold rolled steel 2" x 4" x 1/8" in size, in the oil samples and suspending them in a JAN–H–792 humidity cabinet maintained at a temperature of about 120° F., the panels being surrounded by air of 100% relative humidity. Failure under this test was considered to take place when rusting occurred to an extent of two or three rust spots of 1 mm. or more in diameter.

Table I

| Oil compositions: | Hours to rust |
|---|---|
| Base oil | 1 |
| Base oil +3% sodium sulfonate | 48 |
| Base oil +0.2% aluminum hydroxide | 1 |
| Base oil +3% sodium sulfonate +0.06% aluminum hydroxide | 168 |
| Base oil +3% sodium sulfonate +0.12% aluminum hydroxide | 312 |
| Base oil +1.5% sodium sulfonate +0.06% aluminum hydroxide | 80 |
| Base oil +1.5% sodium sulfonate +0.12% aluminum hydroxide | 312 |

EXAMPLE 2

The tests of Example 1 were repeated with the exception that the aluminum hydroxide was replaced by an organophilic bentonitic material. This material has been prepared in accordance with the method described above with the aid of octadecyl amine hydrochloride and is commercially marketed by the National Lead Company as Bentone 18. The average particle size was about 2 to 3 microns. The results are summarized below.

Table II

| Oil compositions: | Hours to rust |
|---|---|
| Base oil | 1 |
| Base oil+1.5% sodium sulfonate | 24 |
| Base oil+1.5% sodium sulfonate+0.04% bentone 18 | 48 |
| Base oil+3% sodium sulfonate+0.1% bentone 18 | 168 |
| Base oil+1.5% sodium sulfonate+0.1% bentone 18 | 168 |

EXAMPLE 3

In this series of tests in which the base oil of the previous examples was used, the finely-divided solid material was a polyvinyl alcohol ground to an average particle size of about 1 to 10 microns. The alcohol employed was a commercial product containing about 90% (of theory) OH groups and 10% acetate, and having a viscosity of about 35–55 centipoises as a 4% water suspension at 20° C. (Hoeppler falling ball method.) The following results were obtained:

Table III

| Oil compositions: | Hours to rust |
|---|---|
| Base oil | 1 |
| Base oil+3% sodium sulfonate | 48 |
| Base oil+3% sodium sulfonate+0.05% polyvinyl alcohol | 330 |
| Base oil+3% sodium sulfonate+0.1% polyvinyl alcohol | 330 |

EXAMPLE 4

The conventional anti-rust additive used in this series was a synthetic polypropylbenzene sodium sulfonate and the solid material was the aluminum hydroxide of Example 1. The base oil was the same as in the previous tests. The following were the results:

Table IV

| Oil composition: | Hours to rust |
|---|---|
| Base oil | 1 |
| Base oil+1.5% polypropylbenzene sodium sulfonate | 80 |
| Base oil+1.5% polypropylbenzene sodium sulfonate+0.1% aluminum hydroxide | 330 |

As is evident from the data listed above, the rust inhibiting properties of metal sulfonates are greatly enhanced by the presence of the finely-divided water- and oil-insoluble solid materials.

It was also found that certain finely-divided non-abrasive solids of the type described above may be added to oils to overcome excessive valve leakage. These solids may thus be incorporated in various oils of lubricating grade for the purpose of reducing leakage in hydraulic and transmission systems as well as in crankcase oils and the like. The particle size in this connection should preferably range between 1 and 10 microns, although sizes between 0.1 and 100 microns are permissible. The concentration of the solid materials in the total composition may range from 0.001 to 0.5% by weight, 0.002 to 0.01% being preferred, and the conventional rust inhibitors may be omitted. The data below were obtained on an aircraft wing flap control valve with a base oil consisting of a low pour hydrocarbon oil with a kinematic viscosity of about 10 centistokes at 130° F. and a pour point of −75° F. The tests consisted of applying 3000 p. s. i. of hydraulic pressure to the valve body, allowing 2 to 5 minutes stabilization time and determining leakage through the valve during one minute at each of three valve positions, neutral, down and up.

Table V

| Oil | Grams leakage/ min. at 3,000 p. s. i. |
|---|---|
| Base oil | 6.9 |
| Base oil + 0.005% graphite (1–10 microns) | 0 |
| Base oil + 0.0025% graphite (1–10 microns) | 0.4 |
| Base oil + 0.005% carbon black (>0.1 micron) | 2.1 |
| Base oil + 0.005% molybdenum disulfide (>0.1 micron) | 6.0 |
| Base oil + 0.005% fluid cracking silica-alumina catalyst (1–10 microns) | 0 |

Conventional additives such as anti-oxidants e. g. phenols or amines, oiliness agents, e. g. fatty acids, corrosion inhibitors, e. g. sulfurized hydrocarbons or fatty oils, extreme pressure agents, e. g. sulfurized and chlorinated hydrocarbons, and the like may be incorporated into the oil compositions to impart to them certain desirable characteristics as will be understood by those skilled in the art.

What is claimed is:

An oil composition of improved rust preventive properties comprising a mineral lubricating oil, 1 to 6% by weight, based on the total composition, of sodium sulfonate and 0.05 to 0.15% by weight, based on the total composition, of finely divided substantially water- and oil-insoluble aluminum hydroxide having an average particle size of about 1 to 10 microns and capable of promoting and stabilizing a water-in-oil emulsion.

References Cited in the file of this patent
UNITED STATES PATENTS

| 2,445,901 | Ambrose | July 27, 1948 |
| 2,676,925 | Lindstrom et al. | Apr. 27, 1954 |